US012782859B2

(12) United States Patent
Obata

(10) Patent No.: US 12,782,859 B2
(45) Date of Patent: Nov. 3, 2026

(54) IMAGE FORMING APPARATUS WITH POST PROCESSING FOLDING AND ORIENTATION CONTROL

(71) Applicant: Toshiba Tec Kabushiki Kaisha, Tokyo (JP)

(72) Inventor: Satoshi Obata, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/075,209

(22) Filed: Mar. 10, 2025

(65) Prior Publication Data

US 2025/0306514 A1 Oct. 2, 2025

(30) Foreign Application Priority Data

Apr. 2, 2024 (JP) ................................ 2024-059569

(51) Int. Cl.
*G03G 15/00* (2006.01)
*B65H 37/00* (2006.01)
(Continued)

(52) U.S. Cl.
CPC ......... *G03G 15/6529* (2013.01); *B65H 37/06* (2013.01); *B65H 45/20* (2013.01);
(Continued)

(58) Field of Classification Search
CPC ............... G03G 15/5016; G03G 15/65; G03G 15/6529; G03G 2215/00556; G03G 2215/00877; B41J 11/0025; B41J 13/0036; B65H 37/06; B65H 45/20; B65H 2301/13; B65H 2301/134; B65H 2301/33; B65H 2301/45; B65H 2701/18271; B65H 2701/18272; B65H 2801/03; B65H 2801/06; B65H 2801/15; H04N 1/00639; H04N 2201/3254; G06K 15/181;
(Continued)

(56) References Cited

U.S. PATENT DOCUMENTS 7,072,070 B2 * 7/2006 Masaki .................. G06K 15/02
715/251
8,600,287 B2 * 12/2013 Takahashi ............ B65H 45/142
399/407

(Continued)

*Primary Examiner* — Robert B Beatty
(74) *Attorney, Agent, or Firm* — FOLEY & LARDNER LLP

(57) ABSTRACT

An image forming apparatus includes a conveyor that conveys a sheet, an image forming unit that forms an image on the sheet, a post-processing unit folds the sheet after the image is formed, and a controller that receives a selection including either a first print mode or a second print mode. The controller controls the image forming apparatus to print a document including a first manuscript serving as a first page of the document and a second manuscript which has a manuscript size different from the first manuscript. In response to the selection of the first print mode, the controller controls an orientation of the first manuscript to be the same as an orientation of the second manuscript. In response to the selection of the a second print mode, the controller controls the orientation of the first manuscript to be different from the orientation of the second manuscript.

17 Claims, 7 Drawing Sheets

(51) Int. Cl.

| | |
|---|---|
| ***B65H 37/06*** | (2006.01) |
| ***B65H 45/00*** | (2006.01) |
| ***B65H 45/20*** | (2006.01) |
| ***H04N 1/00*** | (2006.01) |

(52) U.S. Cl.
CPC ..... *H04N 1/00639* (2013.01); *B65H 2301/13* (2013.01); *B65H 2301/134* (2013.01); *B65H 2301/33* (2013.01); *B65H 2301/45* (2013.01); *B65H 2701/18271* (2013.01); *B65H 2801/06* (2013.01); *G03G 2215/00556* (2013.01); *G03G 2215/00877* (2013.01); *H04N 2201/3254* (2013.01)

(58) Field of Classification Search
CPC .. G06K 15/4065; G06K 15/16; G06F 3/1252; G06F 3/1241
USPC .......................................................... 399/407
See application file for complete search history.

(56) References Cited

U.S. PATENT DOCUMENTS

| | | | | |
|---|---|---|---|---|
| 2002/0159091 | A1* | 10/2002 | Sakura | G06F 3/1253 358/1.15 |
| 2005/0187088 | A1 | 8/2005 | Tsukuba et al. | |
| 2005/0207812 | A1* | 9/2005 | Miyazaki | B65H 45/12 399/407 |
| 2009/0252545 | A1* | 10/2009 | Sasaki | G03G 15/6541 399/410 |
| 2012/0120421 | A1* | 5/2012 | Mochizuki | G06F 3/1256 358/1.9 |

* cited by examiner

IMAGE FORMING APPARATUS WITH POST PROCESSING FOLDING AND ORIENTATION CONTROL

CROSS-REFERENCE TO RELATED APPLICATION

This application is based upon and claims the benefit of priority from Japanese Patent Application No. 2024-059569, filed on Apr. 2, 2024, the entire contents of which are incorporated herein by reference.

FIELD

Embodiments described herein relate generally to an image forming apparatus.

BACKGROUND

Some image forming apparatuses include a post-processing device having a folding function. The post-processing device can perform various folding methods such as double-folding, triple-folding, and Z-folding. In printing using the folding function, special consideration is necessary for controlling an orientation of a print image.

In particular, in the Z-folding, a case is assumed in which a document including a mixture of manuscripts having different sizes (for example, A3-sized manuscripts and A4-sized manuscripts) is printed. In addition, the manuscripts may have mixed orientations (portrait which is vertically long and landscape which is horizontally long). The orientation of a sheet to be folded changes depending on the orientation of the manuscript. However, due to restrictions of a page description language, an orientation of a manuscript of a first page of a document is recognized by the designated orientation of the sheet, while orientations of manuscripts on second and subsequent pages are not recognized.

DETAILED DESCRIPTION

To solve the problem, in some implementation examples, orientations of second and subsequent pages of the manuscripts can be determined by extending the page description language. Then, it is necessary to use a specially extended page description language. Thus, a problem arises in that it is difficult to use page description languages such as postscript and printer command language (PCL) which are considered to be industry standards.

In general, according to one embodiment, provided is an image forming apparatus capable of appropriately performing Z-folding using an industry-standard page description language.

The image forming apparatus according to an embodiment includes a conveyor, an image forming unit, a post-processing unit, and a controller. The conveyor conveys a sheet along a conveyance direction. The image forming unit forms an image on the sheet. The post-processing unit folds the sheet after the image is formed. The controller receives a selection that includes either a first print mode or a second print mode. The controller controls the conveyor, the image forming unit, and the post-processing unit to print a document including a first manuscript serving as a first page of the document and a second manuscript which has a manuscript size different from the first manuscript. In response to the selection of the first print mode, the controller controls an orientation of the first manuscript to be the same as an orientation of the second manuscript. In response to the selection of the a second print mode, the controller controls the orientation of the first manuscript to be different from the orientation of the second manuscript.

Hereinafter, an embodiment will be described with reference to the drawings.

Configuration

Figure 1:
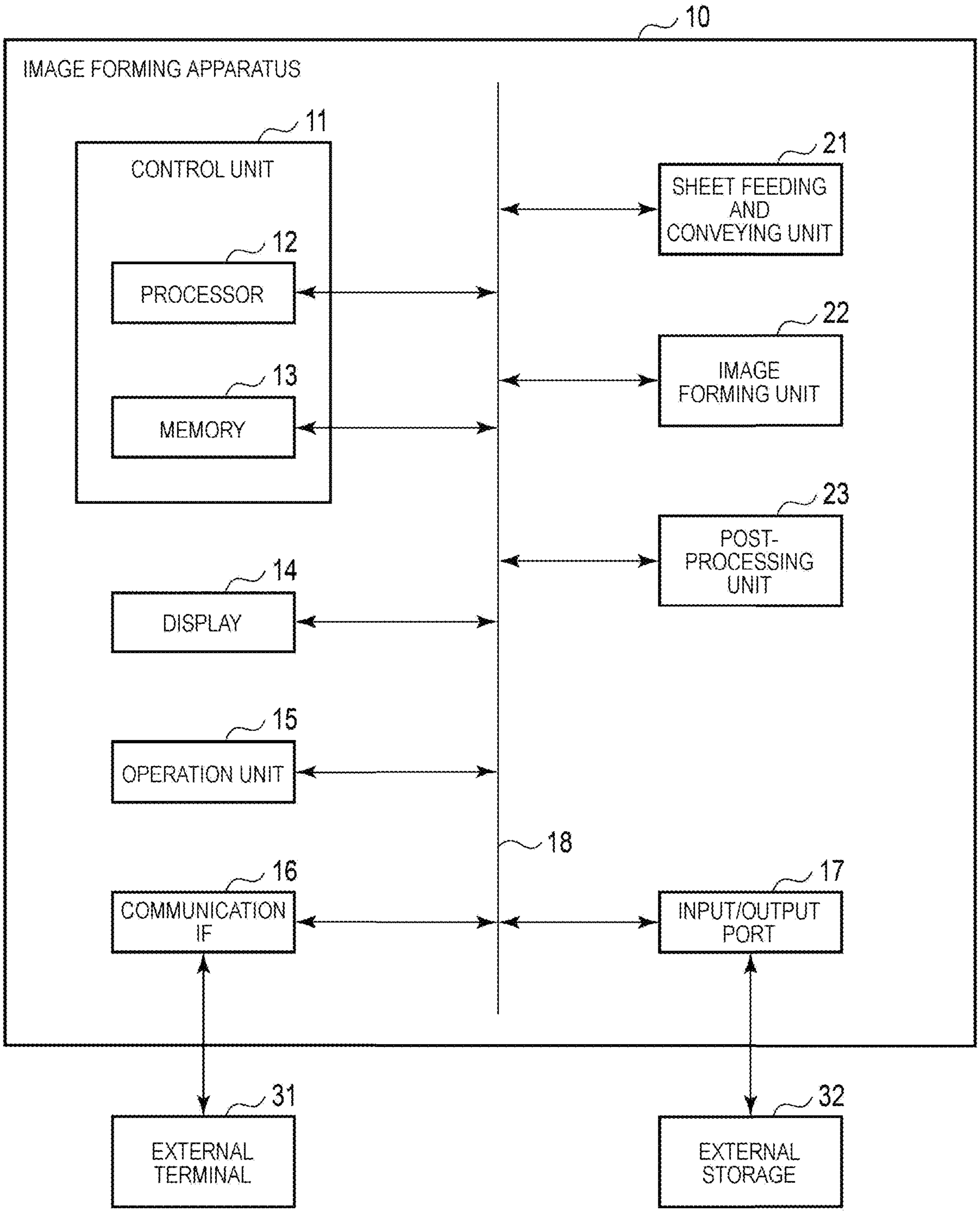
FIG. 1 is a block diagram illustrating a configuration example of an image forming apparatus according to an embodiment.

First, a configuration example of an image forming apparatus according to an embodiment will be described with reference to FIG. 1. FIG. 1 is a block diagram illustrating a configuration example of an image forming apparatus 10 according to the embodiment. The image forming apparatus 10 is, for example, a multi-function printer (MFP), but is not limited thereto.

The image forming apparatus 10 includes a control unit 11, a display 14, an operation unit 15, a communication interface 16, an input/output port 17, a system bus 18, a sheet feeding and conveying unit 21, an image forming unit 22, and a post-processing unit 23. In the drawings, the term “interface” is abbreviated as “IF”.

The system bus 18 (e.g., an internal communication bus) is a communication path between the control unit 11, the display 14, the operation unit 15, the communication interface 16, the input/output port 17, the sheet feeding and conveying unit 21, the image forming unit 22, and the post-processing unit 23. The control unit 11, the display 14, the operation unit 15, the communication interface 16, the input/output port 17, the sheet feeding and conveying unit 21, the image forming unit 22, and the post-processing unit 23 are able to transmit and receive information, data, addresses, control signals, commands, responses, and the like via the system bus 18.

The control unit 11 (e.g., a controller) performs various kinds of control of the image forming apparatus 10. The control unit 11 includes a processor 12 and a memory 13. The processor 12 is a calculation element that executes calculation processing. The processor 12 performs various processes based on, for example, programs and data used in the programs, which are stored in the memory 13. The memory 13 stores the programs, the data used in the programs, and the like to be rewritable.

The display 14 (e.g., a user interface) is, for example, a display device such as a liquid crystal display. The display 14 displays an image in response to video signals that are input from the processor 12, a graphic controller (not illustrated in the drawing) for performing image processing, and the like.

The operation unit 15 (e.g., a user interface, an input device, a sensor, etc.) includes an operation member that generates an operation signal based on a user's operation (e.g., a user input, an input from a user, etc.). Examples of the operation member include, for example, a touch sensor, a numeric keypad, a power key, a sheet feed key, various function keys, a keyboard, and the like. Examples of the touch sensor include a resistive touch sensor, a capacitive touch sensor, and the like. The touch sensor acquires information that indicates a designated position within a certain region. The touch sensor may also be used as a touch panel that is disposed on an upper surface of the display 14 and configured integrally with the display 14. Here, the touch sensor generates a signal that indicates a touched position on a screen displayed on the display 14.

The communication interface 16 (e.g., a network interface) is an interface that communicates with an external device. The communication interface 16 is used, for example, to communicate with an external terminal 31 that transmits print data to the image forming apparatus 10. The communication interface 16 communicates with the external terminal 31 via a wired or wireless network, for example, a local area network (LAN). The external terminal 31 is a control server, a personal computer (PC), or the like that controls the image forming apparatus 10.

The input/output port 17 is an interface for connecting an external storage 32 that stores a document including print data. The input/output port 17 is used to supply the print data to the image forming apparatus 10. For example, the input/output port 17 is a universal serial bus (USB) port, and the external storage 32 is a USB memory.

The sheet feeding and conveying unit 21 (e.g., a sheet feeder, a conveyor, etc.) feeds and conveys (e.g., transports) a sheet which is a print medium. The sheet feeding and conveying unit 21 can feed and convey a plurality of types of sheets. For example, the sheet feeding and conveying unit 21 includes a plurality of sheet feeding cassettes that respectively contain each of a plurality of types of sheets having different sizes. Thereby, the sheet feeding and conveying unit 21 can select a sheet suitable for a manuscript to be printed among the contained sheets, and can feed and convey the selected sheet. The sheet feeding and conveying unit 21 may also include a manual feeding tray. The sheet feeding and conveying unit 21 includes a conveyance belt that conveys the sheet, a plurality of rollers (e.g., driving rollers and driven rollers) supporting the conveyance belt, a conveyance motor that rotates the driving roller, and the like.

For example, due to restriction of a width of a conveying mechanism, the sheet feeding and conveying unit 21 is capable of either vertical conveyance or horizontal conveyance of a first sheet having a first size, and is capable of only horizontal conveyance of a second sheet having a second size larger than the first size. For example, the first sheet is an A4-sized sheet, and the second sheet is an A3-sized sheet. Vertical conveyance refers to conveyance of the sheet while a short side of the sheet is aligned with a conveyance direction. Horizontal conveyance refers to conveyance of the sheet while a long side of the sheet is aligned with the conveyance direction.

The plurality of types of sheets may include not only the A4-sized sheet and the A3-sized sheet but also other types of sheets.

The image forming unit 22 (e.g., a printer) forms an image on the sheet conveyed by the sheet feeding and conveying unit 21. For example, the image forming unit 22 includes an inkjet head and forms an image by ejecting ink onto the sheet. For example, to form a color image, the image forming unit 22 includes a plurality of inkjet heads, each of which correspond to colors of inks, for example, colors of cyan, magenta, yellow, black, and the like.

For example, the image forming apparatus 10 receives a document including print data from the external terminal 31 via the communication interface 16, and forms an image corresponding to the print data on a sheet by the image forming unit 22. Alternatively, the image forming apparatus 10 receives a document including print data from the external storage 32 connected to the input/output port 17, and forms an image corresponding to the print data on a sheet by the image forming unit 22.

Under control of the control unit 11, the post-processing unit 23 (e.g., a post processor, a stapler, a folding actuator, etc.) performs a folding process on the sheet after image formation by the image forming unit 22, as necessary. For example, the post-processing unit 23 performs Z-folding on the sheet after image formation. Here, Z-folding refers to a process of folding the sheet in half in the conveyance direction of the sheet and folding the downstream half of the sheet in half again (e.g., folding the sheet into a Z shape). For example, the post-processing unit 23 performs Z-folding on the A3-sized sheet and does not perform Z-folding on the A4-sized sheet. The control unit 11 controls the entire image forming apparatus 10. For example, in printing of a document including manuscripts (e.g., image data, page data) of a plurality of sizes, for example, a document including a first manuscript which is a manuscript of a first page and a second manuscript having a size different from the first manuscript, the control unit 11 has a first print mode and a second print mode, and allows a user to select any of the first print mode or the second print mode. In the first print mode, an orientation of the first manuscript is same as an orientation of the second manuscript. In the second print mode, the orientation of the first manuscript differs from the orientation of the second manuscript.

For example, when a document including print data is received from the external terminal 31, the control unit 11 allows the user to select any of the first print mode or the second print mode from the external terminal 31. For example, the user can select a print mode by transmitting information for selecting a print mode suitable for the document along with the document.

When a document including print data is received from the external storage 32 connected to the input/output port 17, the control unit 11 allows the user to select any of the first print mode or the second print mode by the display 14 and the operation unit 15. For example, when printing a document in the external storage 32, the user can select a print mode by operating the operation unit 15 based on information displayed on the display 14.

Operations

Figure 2:
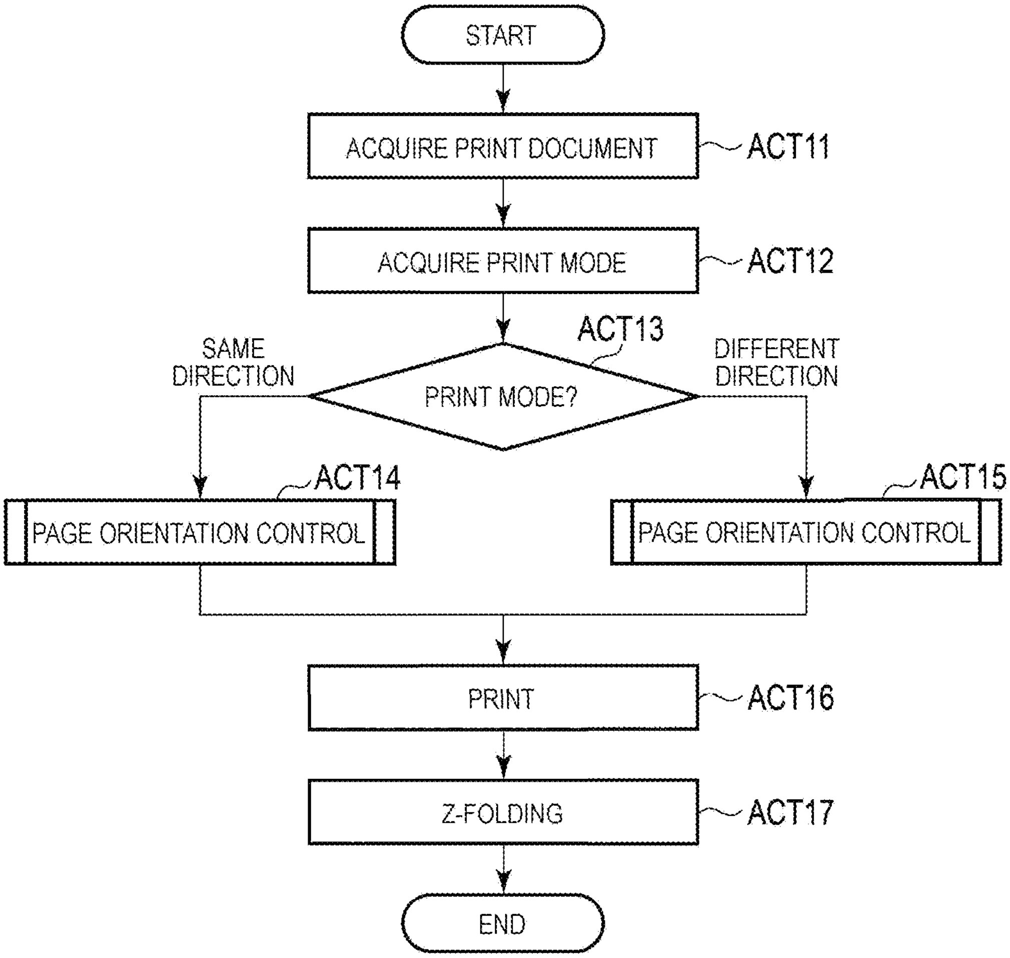
FIG. 2 is a flowchart illustrating a flow of an operation example of the image forming apparatus.

Next, an operation example of the image forming apparatus 10 according to the embodiment will be described with reference to FIG. 2. FIG. 2 is a flowchart illustrating a flow of an operation example of the image forming apparatus 10 according to the embodiment. In the following description, for convenience of description, a document to be printed includes a small-sized manuscript and a large-sized manuscript, the small-sized manuscript is printed on an A4-sized sheet, the large-sized manuscript is printed on an A3-sized sheet, and Z-folding is performed on the A3-sized sheet. Each of the small-sized manuscript and the large-sized manuscript does not have to be of a single size, and may include a plurality of sizes. In the following description, the small-sized manuscript is referred to as a small manuscript, and the large-sized manuscript is referred to as a large manuscript.

In Act 11, the control unit 11 acquires a document to be printed. Hereinafter, the document to be printed is simply referred to as a print document. In Act 12, the control unit 11 acquires information about print mode. The information about print mode is simply referred to as a print mode.

In one example, the control unit 11 acquires the print document and the print mode from the external terminal 31 via the communication interface 16. In another example, the control unit 11 acquires the print document from the external storage 32 via the input/output port 17, and acquires the print mode from the operation unit 15.

In Act 13, the control unit 11 determines whether the print mode is a first print mode or a second print mode. The first print mode is a print mode in which an orientation of a first manuscript is same as an orientation of a second manuscript. The second print mode is a print mode in which the orientation of the first manuscript differs from the orientation of the second manuscript. The first manuscript is a manuscript of a first page, and the second manuscript is a manuscript having a size different from a size of the manuscript of the first page. Hereinafter, the first print mode may be referred to as a same-direction mode, and the second print mode may be referred to as a different-direction mode.

If the print mode is the same-direction mode, in Act 14, page orientation control is performed for each manuscript of the print document. If the print mode is the different-direction mode, in Act 15, page orientation control is performed for each manuscript of the print document. The page orientation control in Act 14 and the page orientation control in Act 15 will be described later with reference to FIGS. 3 and 4, respectively.

The page orientation control in Act 14 or the page orientation control in Act 15 is performed. Thereafter, in Act 16, the control unit 11 instructs the sheet feeding and conveying unit 21 to feed and convey a sheet, and the sheet feeding and conveying unit 21 feeds and conveys the sheet. Then, the control unit 11 instructs the image forming unit 22 to form an image, and the image forming unit 22 prints the print document.

After printing in Act 16 is performed, in Act 17, the control unit 11 instructs the post-processing unit 23 to perform Z-folding on the A3-sized sheet, and the post-processing unit 23 performs Z-folding on the A3-sized sheet.

Through the series of operations, a printed matter including a mixture of A4-sized sheets not subjected to Z-folding and A3-sized sheets subjected to Z-folding is created.

Page Orientation Control in Same-Direction Mode

Figure 3:
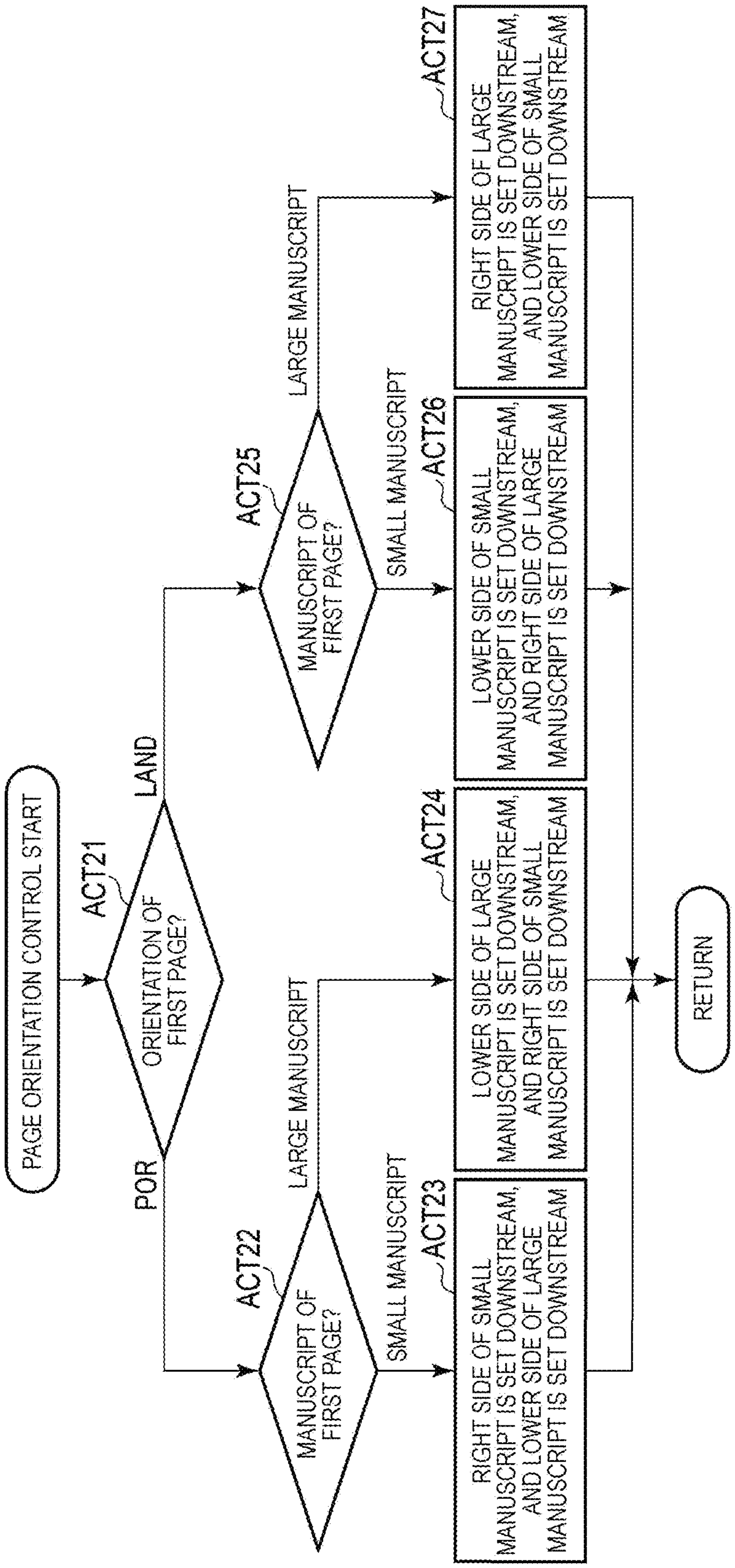
FIG. 3 is a flowchart illustrating a flow of page orientation control in a same-direction mode illustrated in FIG. 2.

Next, referring to FIG. 3, the page orientation control in the same-direction mode will be described. FIG. 3 is a flowchart illustrating a flow of the page orientation control in the same-direction mode.

In Act 21, the control unit 11 determines whether the orientation of the manuscript of the first page of the print document is portrait (vertically elongated) or landscape (horizontally elongated). In FIG. 3, portrait is written as "POR" and landscape is written as "LAND". Notations of "POR" and "LAND" are the same in other drawings.

If the result of the determination in Act 21 is that the orientation of the manuscript of the first page is portrait (POR in Act 21), in Act 22, the control unit 11 determines whether the manuscript of the first page of the print document is a small manuscript or a large manuscript.

If the result of the determination in Act 22 is that the manuscript of the first page is a small manuscript (small manuscript in Act 21), in Act 23, the control unit 11 adjusts the orientation of each manuscript of the print document such that a right side of the small manuscript is set downstream in the conveyance direction and a lower side of the large manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 5:
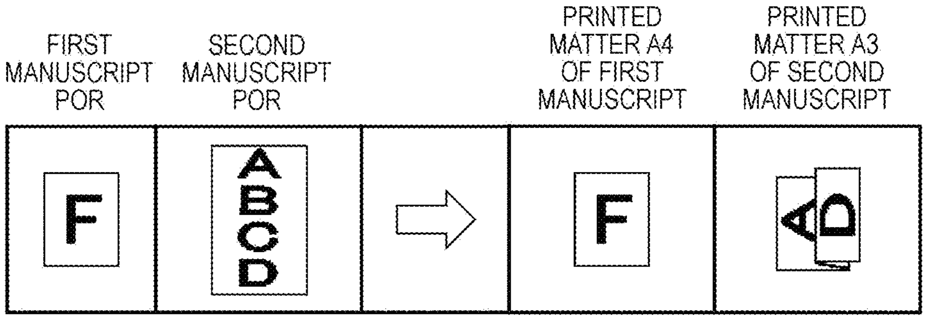
FIG. 5 is a diagram illustrating an example of a first manuscript, a second manuscript, a printed matter of the first manuscript, and a printed matter of the second manuscript in page orientation control in the same-direction mode.

FIG. 5 illustrates a first manuscript which is a manuscript of a first page of the print document, a second manuscript which has a size different from the first manuscript, a printed matter of the first manuscript, and a printed matter of the second manuscript. Here, both the orientation of the first manuscript and the orientation of the second manuscript are portrait, the first manuscript is printed on an A4-sized sheet, the second manuscript is printed on an A3-sized sheet, and the A3-sized sheet on which the second manuscript is printed is subjected to Z-folding.

If the result of the determination in Act 22 is that the manuscript of the first page is a large manuscript (large manuscript in Act 21), in Act 24, the control unit 11 adjusts the orientation of each manuscript of the print document such that a lower side of the large manuscript is set downstream in the conveyance direction and a right side of the small manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 6:
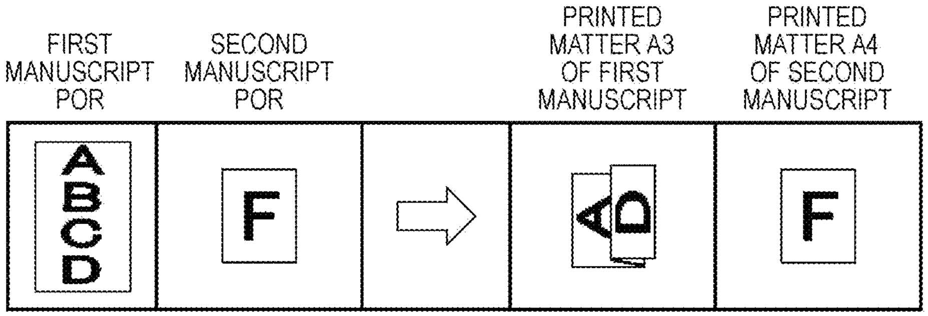
FIG. 6 is a diagram illustrating another example of a first manuscript, a second manuscript, a printed matter of the first manuscript, and a printed matter of the second manuscript in page orientation control in the same-direction mode.

FIG. 6 illustrates a first manuscript, a second manuscript, a printed matter of the first manuscript, and a printed matter of the second manuscript. Here, both the orientation of the first manuscript and the orientation of the second manuscript are portrait, the first manuscript is printed on an A3-sized sheet, the second manuscript is printed on an A4-sized sheet, and the A3-sized sheet on which the first manuscript is printed is subjected to Z-folding.

If the result of the determination in Act 21 shows that the orientation of the manuscript of the first page is landscape (LAND in Act 21), in Act 25, the control unit 11 determines whether the manuscript of the first page of the print document is a small manuscript or a large manuscript.

If the result of the determination in Act 25 shows that the manuscript of the first page is a small manuscript (small manuscript in Act 25), in Act 26, the control unit 11 adjusts the orientation of each manuscript of the print document such that a lower side of the small manuscript is set downstream in the conveyance direction and a right side of the large manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 7:
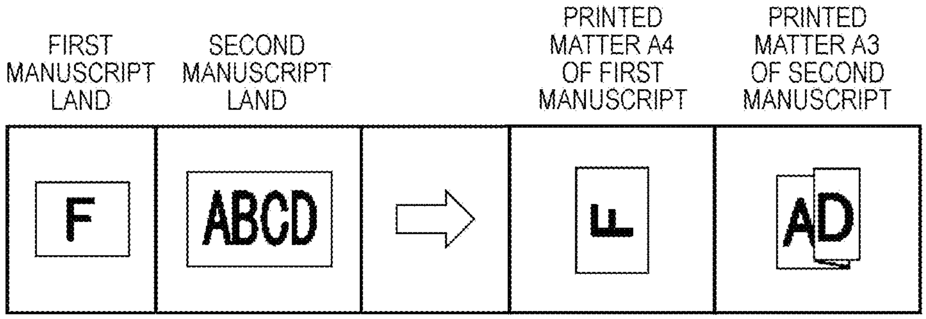
FIG. 7 is a diagram illustrating another example of a first manuscript, a second manuscript, a printed matter of the first manuscript, and a printed matter of the second manuscript in page orientation control in the same-direction mode.

FIG. 7 illustrates a first manuscript, a second manuscript, a printed matter of the first manuscript, and a printed matter of the second manuscript. Here, both the orientation of the first manuscript and the orientation of the second manuscript are landscape, the first manuscript is printed on an A4-sized sheet, the second manuscript is printed on an A3-sized sheet, and the A3-sized sheet on which the second manuscript is printed is subjected to Z-folding.

If the result of the determination in Act 25 is that the manuscript of the first page is a large manuscript (large manuscript in Act 25), in Act 27, the control unit 11 adjusts the orientation of each manuscript of the print document such that a right side of the large manuscript is set downstream in the conveyance direction and a lower side of the small manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 8:
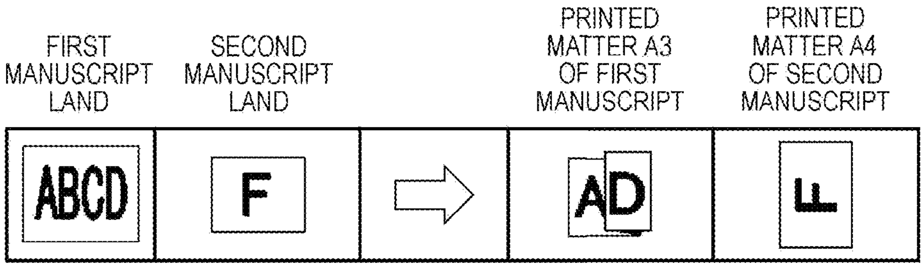
FIG. 8 is a diagram illustrating another example of a first manuscript, a second manuscript, a printed matter of the first manuscript, and a printed matter of the second manuscript in page orientation control in the same-direction mode.

FIG. 8 illustrates a first manuscript, a second manuscript, a printed matter of the first manuscript, and a printed matter of the second manuscript. Here, both the orientation of the first manuscript and the orientation of the second manuscript are landscape, the first manuscript is printed on an A3-sized sheet, the second manuscript is printed on an A4-sized sheet, and the A3-sized sheet on which the first manuscript is printed is subjected to Z-folding.

Page Orientation Control in Different-Direction Mode

Figure 4:
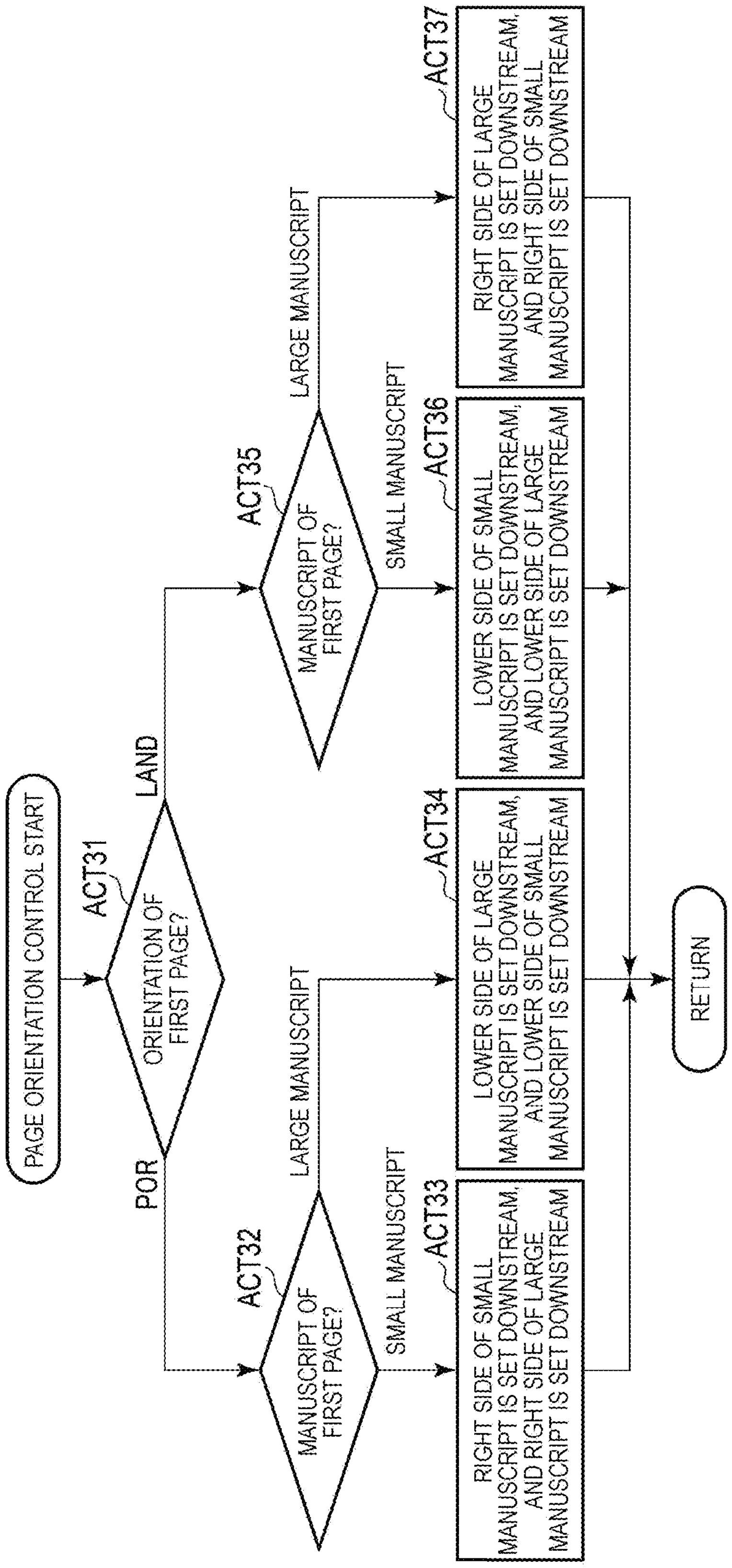
FIG. 4 is a flowchart illustrating a flow of page orientation control in a different-direction mode illustrated in FIG. 2.

Next, referring to FIG. 4, the page orientation control in the different-direction mode will be described. FIG. 4 is a flowchart illustrating a flow of the page orientation control in the different-direction mode.

In Act 31, the control unit 11 determines whether the orientation of the manuscript of the first page of the print document is portrait or landscape.

If the result of the determination in Act 31 is that the orientation of the manuscript of the first page is portrait (POR in Act 31), in Act 32, the control unit 11 determines whether the manuscript of the first page of the print document is a small manuscript or a large manuscript.

If the result of the determination in Act 32 is that the manuscript of the first page is a small manuscript (small manuscript in Act 31), in Act 33, the control unit 11 adjusts the orientation of each manuscript of the print document such that a right side of the small manuscript is set downstream in the conveyance direction and a right side of the large manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 9:
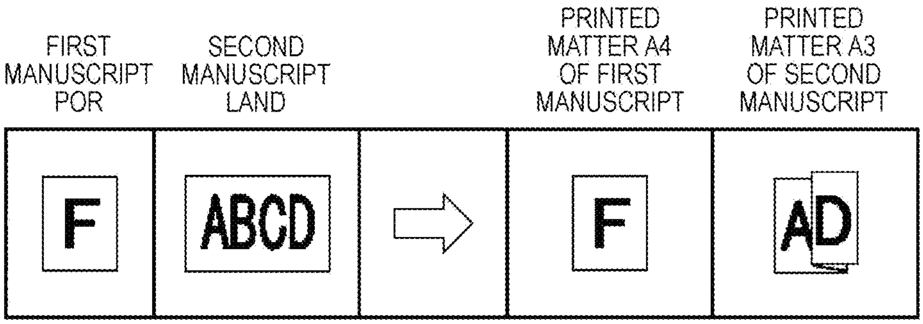
FIG. 9 is a diagram illustrating an example of a first manuscript, a second manuscript, a printed matter of the first manuscript, and a printed matter of the second manuscript in page orientation control in the different-direction mode.

FIG. 9 illustrates a first manuscript, a second manuscript, a printed matter of the first manuscript, and a printed matter of the second manuscript. Here, the orientation of the first manuscript is portrait, the orientation of the second manuscript is landscape, the first manuscript is printed on an A4-sized sheet, the second manuscript is printed on an A3-sized sheet, and the A3-sized sheet on which the second manuscript is printed is subjected to Z-folding.

If the result of the determination in Act 32 is that the manuscript of the first page is a large manuscript (large manuscript in Act 31), in Act 34, the control unit 11 adjusts the orientation of each manuscript of the print document such that a lower side of the large manuscript is set downstream in the conveyance direction and a lower side of the small manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 10:
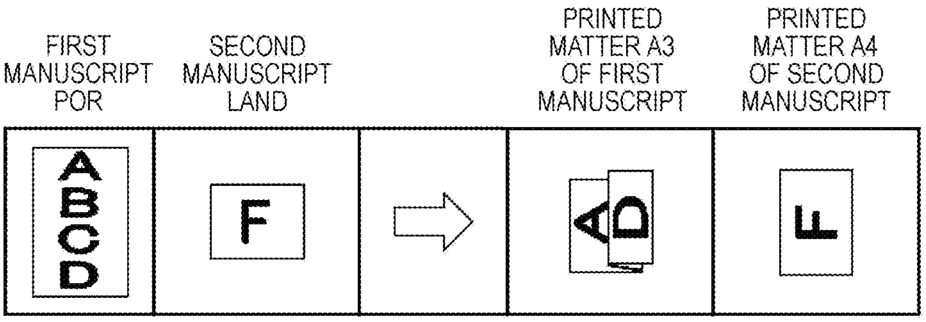
FIG. 10 is a diagram illustrating another example of a first manuscript, a second manuscript, a printed matter of the first manuscript, and a printed matter of the second manuscript in page orientation control in the different-direction mode.

FIG. 10 illustrates a first manuscript, a second manuscript, a printed matter of the first manuscript, and a printed matter of the second manuscript. Here, the orientation of the first manuscript is portrait, the orientation of the second manuscript is landscape, the first manuscript is printed on an A3-sized sheet, the second manuscript is printed on an A4-sized sheet, and the A3-sized sheet on which the first manuscript is printed is subjected to Z-folding.

If the result of the determination in Act 31 shows that the orientation of the manuscript of the first page is landscape (LAND in Act 31), in Act 35, the control unit 11 determines whether the manuscript of the first page of the print document is a small manuscript or a large manuscript.

If the result of the determination in Act 35 shows that the manuscript of the first page is a small manuscript (small manuscript in Act 35), in Act 36, the control unit 11 adjusts the orientation of each manuscript of the print document such that a lower side of the small manuscript is set downstream in the conveyance direction and a lower side of the large manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 11:
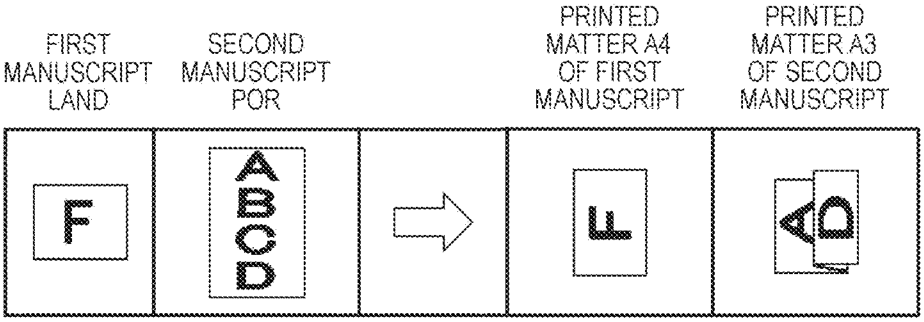
FIG. 11 is a diagram illustrating another example of a first manuscript, a second manuscript, a printed matter of the first manuscript, and a printed matter of the second manuscript in page orientation control in the different-direction mode.

FIG. 11 illustrates a first manuscript, a second manuscript, a printed matter of the first manuscript, and a printed matter of the second manuscript. Here, the orientation of the first manuscript is landscape, the orientation of the second manuscript is portrait, the first manuscript is printed on an A4-sized sheet, the second manuscript is printed on an A3-sized sheet, and the A3-sized sheet on which the second manuscript is printed is subjected to Z-folding.

If the result of the determination in Act 35 is that the manuscript of the first page is a large manuscript (large manuscript in Act 35), in Act 37, the control unit 11 adjusts the orientation of each manuscript of the print document such that a right side of the large manuscript is set downstream in the conveyance direction and a right side of the small manuscript is set downstream in the conveyance direction.

Thereafter, in Act 16, the image forming apparatus 10 prints the print document under control of the control unit 11. Then, in Act 17, the post-processing unit 23 performs Z-folding on the A3-sized sheet.

Figure 12:
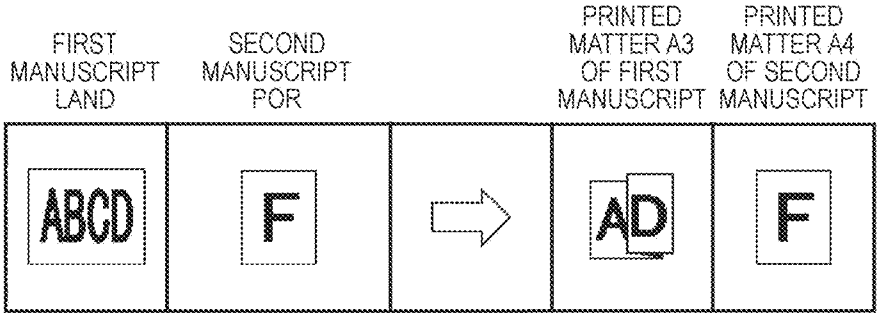
FIG. 12 is a diagram illustrating another example of a first manuscript, a second manuscript, a printed matter of the first manuscript, and a printed matter of the second manuscript in page orientation control in the different-direction mode.

FIG. 12 illustrates a first manuscript, a second manuscript, a printed matter of the first manuscript, and a printed matter of the second manuscript. Here, the orientation of the first manuscript is landscape, the orientation of the second manuscript is portrait, the first manuscript is printed on an A3-sized sheet, the second manuscript is printed on an A4-sized sheet, and the A3-sized sheet on which the first manuscript is printed is subjected to Z-folding.

EFFECTS

In the image forming apparatus 10 according to the embodiment, a document including a first manuscript which is the manuscript of the first page and a second manuscript which has a size different from the first manuscript is printed. In printing of the document, it is possible to select any of a first print mode or a second print mode. In the first print mode, an orientation of the first manuscript is same as an orientation of the second manuscript. In the second print mode, the orientation of the first manuscript differs from the orientation of the second manuscript. Therefore, it is possible to appropriately perform Z-folding while using an industry-standard page description language that does not include information about orientations of the second and subsequent pages of manuscripts of the print document.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
- a conveyor configured to convey a sheet along a conveyance direction;
- an image forming unit configured to form an image on the sheet;
- a post-processing unit configured to fold the sheet after the image is formed; and
- a controller configured to:
  - receive a selection that includes either a first print mode in which a first sheet and a second sheet have a same initial orientation or a second print mode in which the first sheet and the second sheet have different initial orientations;
  - control the conveyor, the image forming unit, and the post-processing unit to print a document including a first image on the first sheet, the first sheet serving as a first page of the document and a second image on the second sheet, the second sheet forming a second page of the document, the second sheet having a second sheet size different from a first sheet size of the first sheet;
  - in response to the selection of the first print mode, determine whether the first sheet and the second sheet define a portrait orientation or a landscape orientation;
  - in response to the selection of the second print mode, determine whether the first sheet has the portrait orientation and the second sheet has the landscape orientation or whether the first sheet has the landscape orientation and the second sheet has the portrait orientation; and
  - adjust an orientation of at least one of the first sheet or the second sheet based on:
    - (i) whether the first print mode or the second print mode is selected, and
    - (ii) whether the first sheet size is smaller than the second sheet size or is larger than the second sheet size.

2. The image forming apparatus of claim 1, wherein the post-processing unit is configured to perform Z-folding on at least one of the first sheet or the second sheet.

3. The image forming apparatus of claim 1, further comprising a user interface configured to receive a user input including the selection.

4. The image forming apparatus of claim 1, wherein the controller is configured to receive the selection from an external device.

5. The image forming apparatus of claim 1, wherein the conveyor is capable of both vertical conveyance and horizontal conveyance of the first sheet having the first sheet size and is capable of only horizontal conveyance of the second sheet having the second sheet size, wherein the second sheet size is larger than the first sheet size.

6. The image forming apparatus of claim 5, wherein the controller is configured to control the post-processing unit such that the post-processing unit folds the second sheet and does not fold the first sheet.

7. The image forming apparatus of claim 1, wherein in response to the selection of the first print mode, the controller is configured to:
- adjust the orientation of the second sheet such that a lower side of the second sheet is set downstream in the conveyance direction based on (a) the first sheet size being smaller than the second sheet size and (b) the orientation of the first sheet being portrait;
- adjust the orientation of the first sheet such that a lower side of the first sheet is set downstream in the conveyance direction based on (a) the first sheet size being smaller than the second sheet size and (b) the orientation of the first sheet being landscape;
- adjust the orientation of the first sheet such that the lower side of the first sheet is set downstream in the conveyance direction based on (a) the first sheet size being larger than the second sheet size and (b) the orientation of the first sheet being portrait;
- adjust the orientation of the second sheet such that the lower side of the second sheet is set downstream in the conveyance direction based on (a) the first sheet size being larger than the second sheet size and (b) the orientation of the first sheet being landscape.

8. The image forming apparatus of claim 1, wherein in response to the selection of the second print mode, the controller is configured to:
- adjust the orientation of the second sheet such that a lower side of the second sheet is set downstream in the conveyance direction based on (a) the first sheet size being smaller than the second sheet size and (b) the orientation of the first sheet being landscape; and
- adjust the orientation of the first sheet such that a lower side of the first sheet is set downstream in the conveyance direction based on (a) the first sheet size being larger than the second sheet size and (b) the orientation of the first sheet being portrait.

9. The image forming apparatus of claim 1, wherein in response to the selection of the second print mode, the controller is configured to control the orientation of the first sheet to be perpendicular to the orientation of the second sheet.

10. An image forming apparatus comprising:

a conveyor configured to convey a sheet along a conveyance direction;

an image forming unit configured to form an image on the sheet;

a post-processing unit configured to fold the sheet after the image is formed; and a controller configured to:

receive an instruction to form a first image on a first sheet having a first sheet size and to form a second image on a second sheet having a second sheet size different from the first sheet size;

receive a selection that includes either a first print mode in which the first sheet and the second sheet have a same initial orientation or a second print mode in which the first sheet and the second sheet have different initial orientations;

in response to the selection of the first print mode, determine whether the first sheet and the second sheet define a portrait orientation or a landscape orientation;

in response to the selection of the second print mode, determine whether the first sheet has the portrait orientation and the second sheet has the landscape orientation or whether the first sheet has the landscape orientation and the second sheet has the portrait orientation; and adjust an orientation of at least one of the first sheet or the second sheet based on:

(i) whether the first print mode or the second print mode is selected, and (ii) whether the first sheet size is smaller than the second sheet size or is larger than the second sheet size.

11. The image forming apparatus of claim 10, wherein the first image represents a first page of a document and the second image represents a subsequent page of the document.

12. The image forming apparatus of claim 10, wherein at least one of (a) the controller is configured to control the post-processing unit to fold the first sheet without folding the second sheet or (b) the controller is configured to control the post-processing unit to fold the second sheet without folding the first sheet.

13. The image forming apparatus of claim 10, wherein the conveyor is capable of both vertical conveyance and horizontal conveyance of the first sheet and is capable of only horizontal conveyance of the second sheet.

14. A method of printing a document, the method comprising:

receiving an instruction to print the document and a selection that includes either a first print mode in which a first sheet and a second sheet have a same initial orientation or a second print mode in which the first sheet and the second sheet have different initial orientations;

printing, by an image forming unit, a first image onto a first sheet having a first sheet size, the first sheet serving as a first page of the document;

conveying, by a conveyor, the first sheet in a conveyance direction;

printing, by the image forming unit, a second image onto a second sheet having a second sheet size different from the first sheet size, the second sheet serving as a second page of the document;

in response to the selection of the first print mode, determining whether the first sheet and the second sheet define a portrait orientation or a landscape orientation;

in response to the selection of the second print mode, determining whether the first sheet has the portrait orientation and the second sheet has the landscape orientation or whether the first sheet has the landscape orientation and the second sheet has the portrait orientation; and adjusting an orientation of at least one of the first sheet or the second sheet based on:

(i) whether the first print mode or the second print mode is selected, and (ii) whether the first sheet size is smaller than the second sheet size or is larger than the second sheet size.

15. The method of claim 14, further comprising folding, by a post-processing unit, only one of the first sheet or the second sheet.

16. The method of claim 14, further comprising:

adjusting the orientation of the second sheet such that a lower side of the second sheet is set downstream in the conveyance direction based on (a) the first sheet size being smaller than the second sheet size and (b) the orientation of the first sheet being portrait;

adjusting the orientation of the first sheet such that a lower side of the first sheet is set downstream in the conveyance direction based on (a) the first sheet size being smaller than the second sheet size and (b) the orientation of the first sheet being landscape;

adjusting the orientation of the first sheet such that the lower side of the first sheet is set downstream in the conveyance direction based on (a) the first sheet size being larger than the second sheet size and (b) the orientation of the first sheet being portrait; and adjusting the orientation of the second sheet such that the lower side of the second sheet is set downstream in the conveyance direction based on (a) the first sheet size being larger than the second sheet size and (b) the orientation of the first sheet being landscape.

17. The method of claim 14, further comprising:

adjusting the orientation of the second sheet such that a lower side of the second sheet is set downstream in the conveyance direction based on (a) the first sheet size being smaller than the second sheet size and (b) the orientation of the first sheet being landscape; and adjusting the orientation of the first sheet such that a lower side of the first sheet is set downstream in the conveyance direction based on (a) the first sheet size being larger than the second sheet size and (b) the orientation of the first sheet being portrait.

* * * * *